United States Patent [19]
Yamamoto

[11] Patent Number: 5,989,150
[45] Date of Patent: Nov. 23, 1999

[54] FULL TOROIDAL TYPE CONTINUOUSLY VARIABLE TRANSMISSION

[75] Inventor: Hideharu Yamamoto, Fuji, Japan

[73] Assignee: Jatco Corporation, Fuji, Japan

[21] Appl. No.: 08/960,215

[22] Filed: Oct. 29, 1997

[30] Foreign Application Priority Data

Oct. 31, 1996 [JP] Japan ................................ 8-290496

[51] Int. Cl.[6] ............................................. F16H 15/38
[52] U.S. Cl. .................................. 476/8; 476/10; 476/42
[58] Field of Search ........................... 476/8, 10, 42

[56] References Cited

U.S. PATENT DOCUMENTS

| | | | |
|---|---|---|---|
| 3,828,618 | 8/1974 | Sharpe et al. | 476/10 |
| 4,339,966 | 7/1982 | Kraus | 476/10 |
| 4,464,946 | 8/1984 | Kraus | 476/8 |
| 5,564,993 | 10/1996 | Robinson | 476/10 |

FOREIGN PATENT DOCUMENTS

| | | | |
|---|---|---|---|
| 63-92859 | 6/1988 | Japan . | |
| 1-229157 | 9/1989 | Japan . | 476/8 |
| 4-502954 | 5/1992 | Japan . | |
| 896203 | 5/1962 | United Kingdom . | |
| 1002479 | 8/1965 | United Kingdom . | |
| 1026734 | 4/1966 | United Kingdom . | |
| 1133265 | 11/1968 | United Kingdom . | |
| WO 90/05860 | 5/1990 | WIPO . | |
| WO 94/01697 | 1/1994 | WIPO . | |
| WO 97/37156 | 10/1997 | WIPO . | |

*Primary Examiner*—Tamara L. Graysay
*Assistant Examiner*—William C Joyce
*Attorney, Agent, or Firm*—Foley & Lardner

[57] ABSTRACT

A friction roller is disposed in a full toroid groove formed by an an input disk and an output disk opposing each other, in contact with both the disks tiltably and rotatably. A roller supporting member for rotatably supporting the friction roller through bearings includes a rotary shaft portion having a ball joint at one end thereof, and the ball joint is rotatably held by a race joint and a cover joint formed at one end of a piston rod of a hydraulic cylinder constituting a driving mechanism. A lubricant spraying portion is fromed at the other end of the rotary shaft portion, and a lubricant is supplied to the lubricant spraying portion from a pressure chamber of the hydraulic cylinder through oil paths formed in the piston rod and the rotary shaft portion. The lubricant is sprayed from the lubricant spraying portion onto a contact surface of the friction roller with the disk, and onto the bearings to achieve lubrication and cooling.

12 Claims, 4 Drawing Sheets

FULL TOROIDAL TYPE CONTINUOUSLY VARIABLE TRANSMISSION

BACKGROUND OF THE INVENTION

1. Field of the Invention

The present invention relates to a full toroidal type continuously variable transmission having a full toroid-like groove formed between an input disk and an output disk, and having a friction roller provided in the full toroid-like groove so that the friction roller is in contact with inner surfaces of the input and output disks tiltably and rotatably.

2. Description of the Related Art

The toroidal type continuously variable transmissions are generally divided into a half toroidal type continuously variable transmission and a full toroidal type continuously variable transmission.

In the half toroidal type continuously variable transmission, since the intersection of two tangents at contact points between the friction roller and the input and output disks is located in the vicinity of a center line of the input and output disks, an advantage is provided in which the spin of the contact surface of the friction roller seldom occurs and the power transmission efficiency is satisfactory. On the other hand, since a reaction force of the output disk acts as thrust on the friction roller resulting in a heavy load, and the friction roller rotates at high speed, a problem of heat generation at a bearing arises. In order to prevent the heat generation, a lubricating system for the bearing is proposed as described in Japanese Utility Model Laid Open Publication No. 63-92859 (hereinafter, referred to as a first prior art example).

In this first prior art example, an oil path for lubrication is formed to introduce a lubricating oil to a position adjacent to a friction roller through the inside of a roller supporting member which supports the friction roller. This oil path includes a hole formed in a piston of a hydraulic cylinder which moves the roller supporting member, a gap formed between an outer periphery of a shaft portion of the roller supporting member and an inner periphery of the piston engaging the shaft portion so that the gap is communicated with the hole, and a hole formed in the inside of the roller supporting member so as to communicate with the gap, and the oil path supplies the lubricating oil to the vicinity of a thrust bearing within the friction roller to thereby lubricate the bearing and the friction roller and also to lubricate a rolling surface of the friction roller by the lubricating oil flowing out of the friction roller.

On the other hand, the full toroidal type continuously variable transmission is disclosed, for example, in Japanese Patent Open Publication Hei No. 4-502954 (hereinafter, referred to as a second prior art example).

In this second prior art example, an input disk and an output disk form a full toroid-like groove, and a friction roller is supported by a roller supporting member within the full toroid-like groove so that the friction roller is tiltable and rotatable on a reference line which passes through an intersection between a center axis of the full toroid-like groove and a center axis of the input and output disks, and the friction roller is tilted by a predetermined caster angle with respect to the center axis of the full toroid-like groove, and the roller supporting member is made movable in the axis direction on the reference line by a hydraulic cylinder. However, there is no mention as to a lubricating method of the friction roller, and it is presumed that a lubricating oil is sprayed externally to the friction roller as is the case in general transmissions.

However, in the full toroidal type continuously variable transmission in the second prior art example, it is difficult to sufficiently lubricate in the lubricating system which is performed from the outside, because the position of a contact surface between the input and output disks and the friction roller is moved due to a change in the gear ratio.

Accordingly, it may be considered to apply the internal lubricating system in which the lubricating oil is fed to the inside of the friction roller as is the case in the first prior art example. However, in the full toroidal type continuously variable transmission, since the tangents at the contact points between the input and output disks and the friction roller do not intersect with each other so that the spin increases, and since the power transmission efficiency at the contact surface is low and at the same time, the heat generation at the contact surface is large as compared with the half toroidal type continuously variable transmission, there is an unsolved problem that the lubrication of the contact points between the input and output disks and the friction roller cannot be performed sufficiently even when the lubricating system similar to the first prior art example is adopted.

SUMMARY OF THE INVENTION

The present invention was made in view of the unsolved problems in the prior art examples, and it is an object to provide a full toroidal type continuously variable transmission capable of lubricating the contact surface between the input and output disks and the friction roller effectively.

In order to achieved the above object, in a first aspect of the invention, a full toroidal type continuously variable transmission comprises an input disk and an output disk disposed opposing to each other to form a full toroid-like groove by opposing surfaces; a friction roller disposed within the full toroid-like groove of the input and output disks so that the friction roller is frictionally in contact with both said disks; a roller supporting member for supporting the friction roller rotatably, the roller supporting member being supported rotatably at a rotary shaft portion at which the roller supporting member is tilted by a predetermined angle with respect to a center line of the full toroid-like groove, the rotary shaft portion being orthogonal to an axis of the input and output disks, the roller supporting member being supported also movably in an axis direction of the rotary shaft portion; and a driving mechanism coupled with the roller supporting member for driving the roller supporting member in an axis direction of the rotary shaft portion, wherein a lubricant spraying portion is formed in the roller supporting member to spray a lubricant to at least a frictional contact surface between the friction roller and the input disk and the output disk.

In the first aspect of the invention, it is possible to directly spray the lubricant to the frictional contact surface between the friction roller and the input disk and the output disk from the lubricant spraying portion formed in the roller supporting member. Furthermore, also during gear shift, since the roller supporting member is also tilted and rotated as a unit with the friction roller when the friction roller tilts and rotates, it is possible to spray the lubricant to the frictional contact surface between the friction roller and the input disk and the output disk from the lubricant spraying portion.

In a second aspect of the invention, the lubricant spraying portion includes a lubricant spraying opening which opposes the frictional contact surface of the friction roller, and a lubricant spraying opening which opposes a bearing for rotatably support the friction roller.

In the second aspect of the invention, it is possible to spray the lubricant to the frictional contact surface of the friction roller directly from each of the lubricant spraying openings of the lubricant spraying portion, and furthermore, it is possible to spray the lubricant to the bearing located at the center axis side of the friction roller, and it is possible to cool a whole surface of the friction roller by the lubricant which flows out of the bearing and which further flows due to a centrifugal force to the frictional contact surface side of the outer peripheral surface of the friction roller.

In a third aspect of the invention, the supply of the lubricant to the lubricant spraying portion is effected through an inner path from a driving mechanism side.

In the third aspect of the invention, since the lubricant is supplied to the lubricant spraying portion through the inner path from the driving mechanism side, the supply of the lubricant is easily performed without providing a lubricant supplying route in the roller supporting member separately.

In a fourth aspect of the invention, the driving mechanism is constituted by a hydraulic cylinder, and a pressure oil of one pressure chamber of the hydraulic cylinder is supplied as the lubricant to the lubricant spraying portion through an internal path formed within a piston rod of the hydraulic cylinder.

In the fourth aspect of the invention, since the pressure oil which is supplied to the hydraulic cylinder for moving the roller supporting member is used as the lubricant, there is no need to provide a lubricant supply system separately for the driving mechanism.

In a fifth aspect of the invention, the supply of the lubricant to the lubricant spraying portion is performed through the inner path of the driving mechanism from an external lubricant supply source.

In the fifth aspect of the invention, since the lubricant is supplied to the lubricant spraying portion of the roller supporting member through the inner path of the driving mechanism from the external lubricant supply source, it is possible to form the lubricant supply system by using a member which has already been present.

DESCRIPTION OF THE PREFERRED EMBODIMENTS

Hereinafter, embodiments of the present invention will be described with reference to the drawings.

Figure 1:
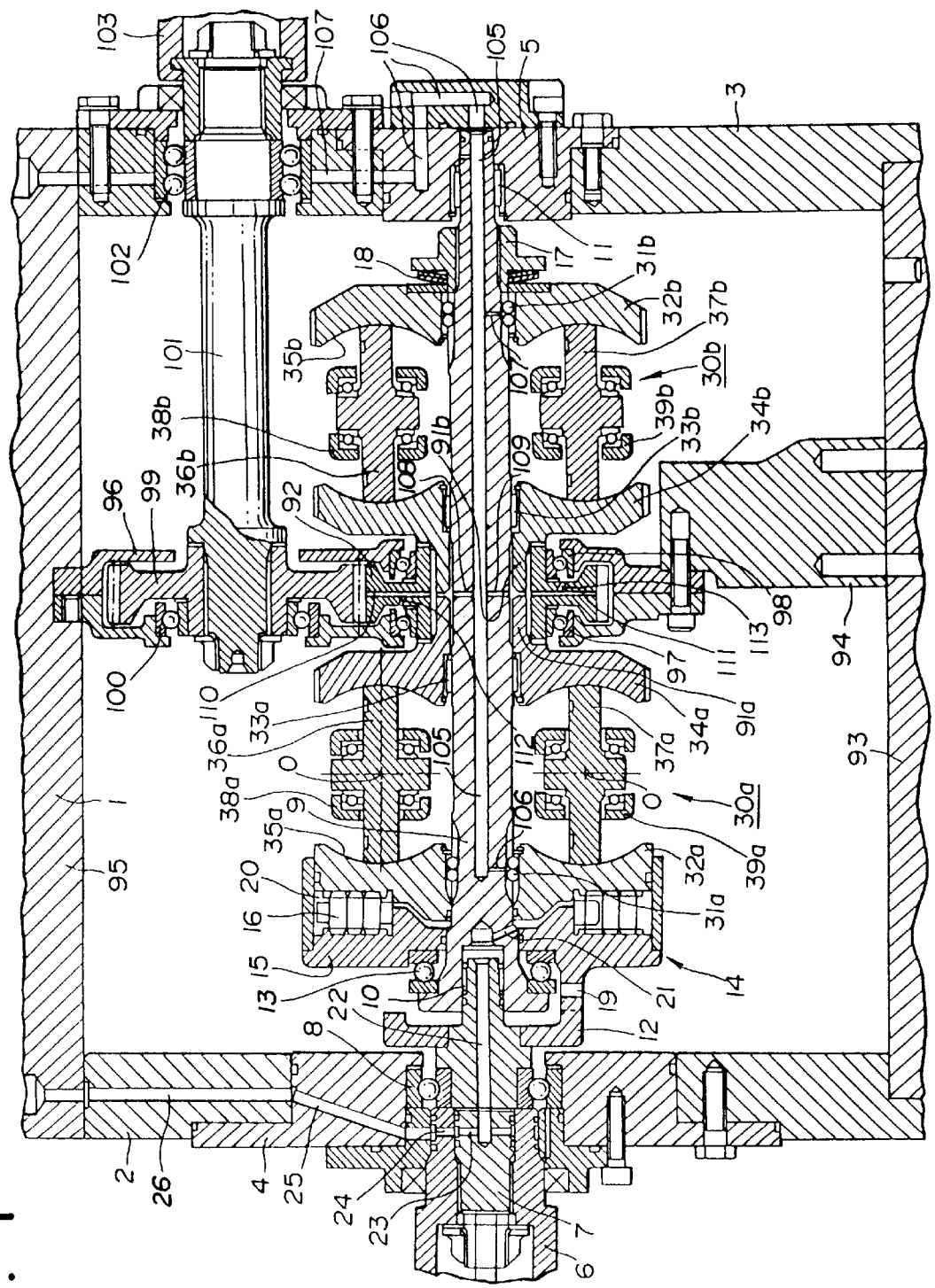
FIG. 1 is a cross-sectional view showing an embodiment of the present invention.

FIG. 1 is a cross sectional view of a full toroidal type continuously variable transmission in an embodiment of the present invention in which bearing portions 4, 5 are respectively formed at center portions of left and right side plates 2, 3 of a transmission housing 1 having, for example, a hollow rectangular parallelepiped shape, an input shaft 7 which is spline-coupled to an external power transmission shaft 6 is rotatably supported through a deep groove ball bearing 8 at the bearing portion 4, a rotary shaft 9 is connected to a right-hand end of the input shaft 7 through a needle bearing 10, and a right-hand end of the rotary shaft 9 is rotatably supported at the bearing portion 5 through a needle bearing 11. The input shaft 7 is formed with a flange 12 which faces an inner wall of the bearing portion 4.

Pressing mechanisms 14 are provided at opposite ends of the rotary shaft 9. The pressing mechanisms 14 include a loading cam 15 rotatably supported at a left end side of the rotary shaft 9 through a thrust bearing 13, an engaging roller 16 which engages wave-like cam surfaces respectively formed on opposing surfaces of the loading cam 15 and a first input disk 32a which will be described later, a holding member 17 which is screwed over a right-hand end side of the rotary shaft 9 so that the holding member 17 faces an inner wall of the right side plate 3, and a pressure adjusting belleville spring 18 interposed between opposing surfaces of the holding member 17 and a second input disk 32b described later, and the pressing mechanisms 14 are rotated as a unit with the input shaft 7 when an engaging projection 19 formed on a left-hand side surface of the loading cam 15 is engaged with the flange 12 formed on the above-mentioned input shaft 7.

Here, the engaging roller 16 is disposed within a space 20 which is liquid-tightly formed between the loading cam 15 and the first input disk 32a, and an oil pressure is supplied into the space 20 through a gap formed between opposing surfaces of the loading cam 15 and the first input disk 32a, an oil path 21 formed in a left-hand end of the rotary shaft 9, an oil path 22 formed from a left-hand side of the input shaft 7, an oil path 23 formed at a left-hand side of the oil path 22 to reach an outer peripheral surface, and oil path 24 formed in the power transmission shaft 6, an oil path 25 formed in the bearing portion 4, and an oil path 26 formed in the left-hand side plate 2. Thus, it is possible to generate thrust proportional to the supplied oil pressure which is added with thrust proportional to a torque due to a lead of cam surfaces of the engaging roller 16.

Between the pressing mechanism 14 at left and right opposite ends of the rotary shaft 9, there are disposed with two sets of first and second toroidal type continuously variable transmission mechanism 30a, 30b line symmetrically with respect to a symmetry axis formed by a center position in an axial direction of the rotary shaft 9.

Each of the toroidal type continuously variable transmission mechanisms 30a, 30b includes the first input disk 32a and the second input disk 32b respectively coupled to the rotary shaft 9 through ball splines 31a and 31b, and the first output disk 34a and the second output disk 34b respectively spaced from the first input disk 32a and the second input disk 32b by a predetermined distance and respectively disposed on the rotary shaft 9 rotatably through needle bearings 33a and 33b, and a pair of upper and lower friction rollers 36a, 37a and a pair of upper and lower friction rollers 36b, 37b. Each of the pair of upper and lower friction rollers 36a, 37a is tiltable and rotatable in contact with the opposing surfaces of the input disk 32a and the output disk 34a in a full toroid-like groove 35a about a center corresponding to the center point O of the full toroid-like groove 35a. Similarly, Each of the pair of upper and lower friction rollers 36b, 37b is tiltable and rotatable in contact with the opposing surfaces of the input disk 32b and the output disk 34b in a full toroid-like groove 35b about a center corresponding to the center point O of the full toroid-like groove 35b.

Here, the friction rollers 36a, 37a and 36b, 37b are respectively supported by roller supporting members 38a, 39a and 38b, 39b rotatably.

Figure 2:
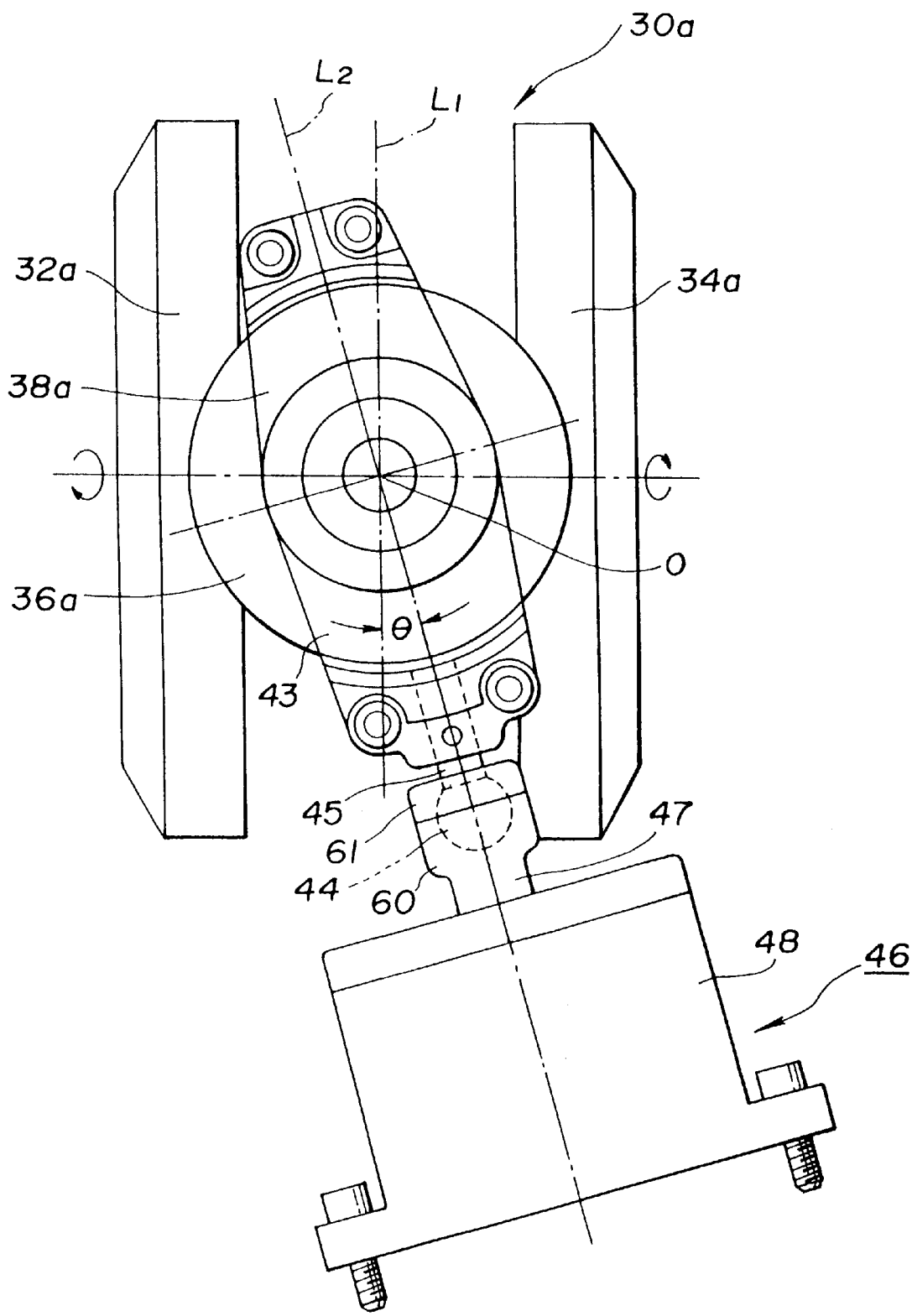
FIG. 2 is a plan view showing a frictional roller supporting member in FIG. 1.
Figure 3:
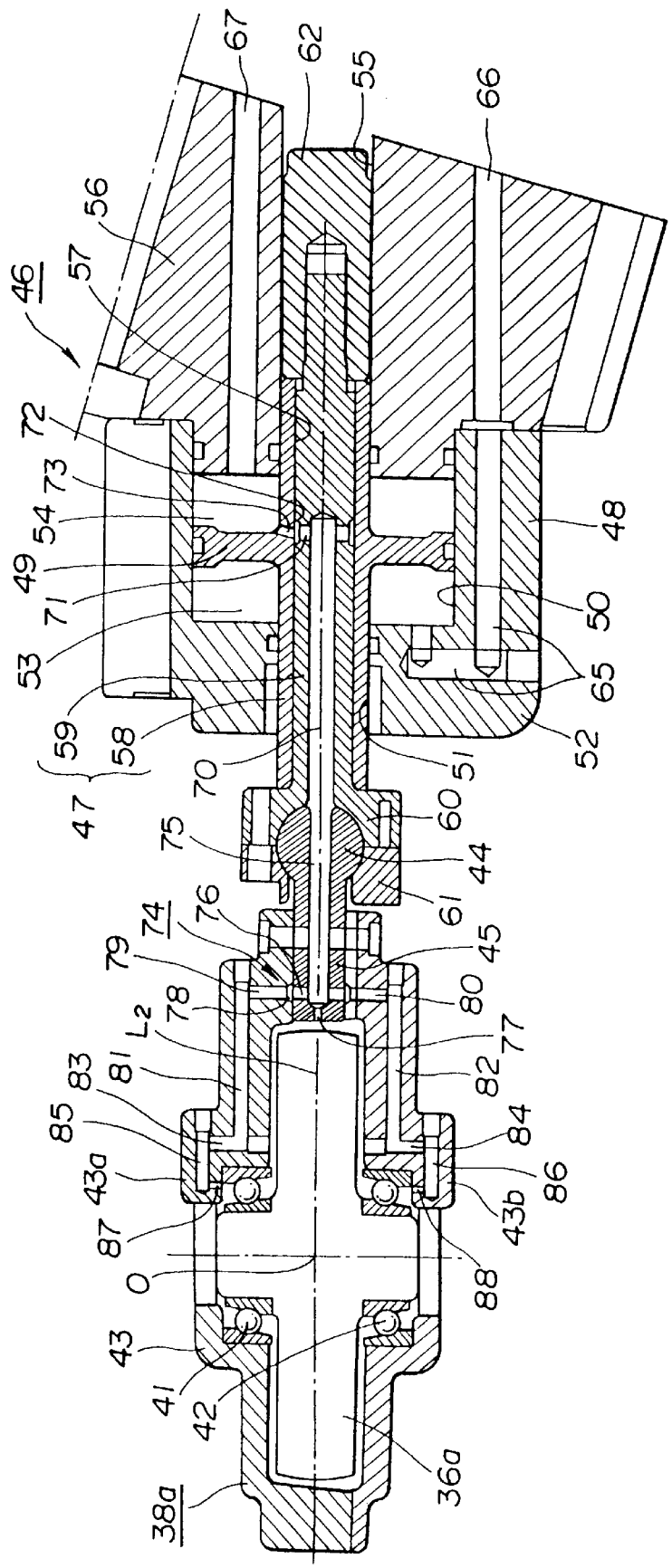
FIG. 3 is a sectional view taken along an axis line $L_2$ in FIG. 2.

These roller supporting members 38a, 39a and 38b, 39b are respectively disposed upper and lower symmetry and left and right symmetry with respect to respective corresponding friction rollers. As shown in FIGS. 2 and 3, each of these roller supporting members 38a, 39a and 38b, 39b is constituted by a supporting portion 43 of a rectangular shape in a plan view for supporting the friction roller 36a by bearings 41 and 42 disposed upper and lower positions of the friction roller 36a, and the supporting portion 43 extends along a slant axis line $L_2$ which is slanted by a predetermined caster angle θ with respect to a longitudinal axis line $L_1$ which passes through the center point O of the friction roller 36a in the full toroid-like groove 35a. Each of these roller supporting members 38a, 39a and 38b, 39b is further constituted by a rotary shaft portion 45 which is fitted into one end of the supporting portion 43 on the slant axis line $L_2$, and rotary shaft portion 45 is fixed by a bolt. The rotary shaft portion 45 protrudes outwardly from the one end of the supporting portion 43 to form a ball joint 44, and the ball joint 44 is coupled with the driving mechanism 46.

Here, the friction rollers 36a, 37a and 36b, 37b are respectively rotatably supported by the roller supporting members 38a, 39a and 38b, 39b under an appropriate preloaded condition since the outer races of the bearing 41, 42 are pressed inwardly when a pair of plate portions 43a, 43b are tightened by a bolt, and thus, the swing of the axis or the whirling at the time of high speed rotation is prevented.

The driving mechanism 46 is constituted by a hydraulic cylinder 48 with the axis line of the piston rod 47 aligned with the above-mentioned slant axis line $L_2$.

The hydraulic cylinder 48 is constituted, as shown in FIG. 3, by a cylinder body 52 having a large diameter hole portion 50 bored from a right-hand end side for accommodating a piston 49 and having a small diameter hole portion 51 communicated with the large diameter hole portion 50, and a supporting block 56 which blockades the large diameter hole portion 50 to form oil pressure chambers 53, 54 defined or partitioned by the piston 49, and which, at the same time, has a through hole 55 bored on the same axis as the small diameter hole portion 51 and having the same diameter as the small diameter hole portion 51. The supporting block 56 is held by the transmission housing 1.

Here, the piston rod 47 is comprised of a cylindrical portion 58 extending in the opposite directions from the piston 49 and having a through hole 57 along the axis line thereof, and a shaft portion 59 fitted into the cylindrical portion 58. The left-hand end portion of the shaft portion 59 protruding to the left beyond the cylindrical portion 58 is formed with a race joint 60 having a spherical race portion at the inner surface thereof, and the race joint 60 is rotatably engaged with the ball joint 44 of the roller supporting member 38a. Under the condition in which this race joint 60 is engaged with the ball joint 44, a joint cover 61 having a similar race portion is tightened by a bolt. The right-hand end portion of the shaft portion 59 is inserted through the through hole 55 of the supporting block 56, and its end is screwed about by a lock nut 62 having the same outer diameter as the cylindrical portion 58 so that the cylindrical portion 58 and the shaft portion 59 are held as a unit.

The oil pressure chamber 53 of the hydraulic cylinder 48 is connected to an oil pressure source through an oil path 65 formed in the cylinder body 52 and an oil path 66 formed in the supporting block 56 and further through a directional change over valve (not shown), and similarly, the oil pressure chamber 54 is connected to the oil pressure source through an oil path 67 formed in the supporting block 56 and further through the directional change over valve.

In this respect, the shaft portion 59 of the piston rod 47 has a lubricating oil path 70 extending from the race joint 60 side to the right-hand side of the piston 49, and an oil path 71 is formed at the right-hand end portion of the lubricating oil path 70 orthogonally to the axis direction and reaching the outer peripheral surface of the shaft portion 59, and an annular groove 72 is formed in the shaft portion 59 at a position corresponding to an opening end of the oil path 71 to the outer peripheral surface, and on the other hand, a lubricant introducing opening 73 is formed in the cylindrical portion 58 between a position in the inner peripheral surface corresponding to the annular groove 72 and a position in the outer peripheral surface corresponding to the oil chamber 54.

Furthermore, each of the roller supporting members 38a, 39a and 38b, 39b is formed with a lubricant spraying portion 74 which sprays the lubricant supplied from the race joint 60 onto a frictional contact surface of the friction roller 36a (37a and 36b, 37b), and the bearings 41, 42.

The lubricant spraying portion 74 is constituted by a lubricant oil path 75 formed in the rotary shaft portion 45 extending from the right-hand end side of the ball joint 44 to just this side from the left-hand end side along the axis line, an oil path 76 formed at the left-hand end of the lubricant oil path 75 orthogonally thereto to reach the outer peripheral surface of the rotary shaft portion 45, a lubricant spraying hole 77 bored between the left-hand end portion of the lubricant oil path 75 and the outer peripheral surface which faces a contact surface on the outer peripheral surface of the friction roller 36a (37a and 36b, 37b) which is in contact with the input and output disks 32a, 32b (and 34a, 34b), annular grooves 78 formed in the supporting portion 43 at positions corresponding to upper and lower opening ends of the oil path 76, oil paths 79, 80 respectively formed extending in upper and lower directions from corresponding annular grooves 78, oil paths 81, 82 formed respectively extending to a left-hand direction from upper and lower ends of the oil paths 79, 80, oil paths 83, 84 formed respectively extending in upper and lower directions from the left-hand end of the oil paths 81, 84, oil paths 85, 86 formed respectively extending in the left-hand direction from the upper and lower ends of the oil paths 83, 84 to positions corresponding to between inner and outer races of the bearings 41, 42, and lubricant spraying holes 87, 88 formed between left-hand ends of the oil paths 85, 86 and an inner surface of the outer race supporting portion 43 corresponding to the bearings 41, 42.

The first input disk 32a and the second input disk 32b are pressed inwardly by the above-mentioned pressing mechanisms 14, and thus, a contact pressure corresponding to the torque is applied between the friction roller 36a (37a and 36b, 37b) and the input disk 32a (32b) and output disk 34a (34b).

On the other hand, the first output disk 34a and the second output disk 34b are respectively formed with cylindrical portions 91a and 91b which are in contact with each other, and an output gear 92 is spline-coupled to both the cylindrical portions 91a and 91b. The output gear 92 is rotatably supported through, bearings 97, 98, by a gear supporting member 96 which is fixed between a supporting table 94 fixed to a bottom plate 93 of the transmission housing 1 and an upper plate 95 of the transmission housing 1.

Furthermore, a counter gear 99 engaging the output gear 92 is rotatably supported by the gear supporting member 96 through a bearing 100, and an output shaft 101 is spline-coupled to a center shaft hole of the counter gear 99. The left-hand end side of the output shaft 101 is rotatably supported by the right-hand side plate 3 through a bearing 102, and the output shaft 101 is spline-coupled with an outer power transmission shaft 103.

Furthermore, the rotary shaft 9 is bored with a lubricant oil path 105 at the center axis position extending from the right-hand side to a position corresponding to a ball spline 31a, and oil paths 106, 107 are bored at positions corresponding to the ball splines 31a, 31b to supply the lubricant to the ball splines 31a, 31b, and also oil paths 108, 109 are bored at positions corresponding to cylindrical portions 91a, 91b of the output disks 34a, 34b to supply the lubricant to the cylindrical portions 91a, 91b. Also, oil paths 110, 111 are bored at positions corresponding to the oil paths 108, 109 of the output gear 92 to reach a tooth portion of an outer peripheral portion, and at the midway of the oil paths 110, 111, oil paths 112, 113 are bored to supply the lubricant to the bearings 97, 98.

The lubricant oil path 105 of the rotary shaft 9 is connected to an external lubricating oil supply source through an oil path 106 formed in the bearing portion 5 and through an oil path 107 formed in the right-hand side plate 3.

Next, the operation of the above-mentioned embodiment will be explained.

It is supposed that, as shown in FIG. 1, the friction rollers 36a, 37a and 36b, 37b supported respectively by the roller supporting members 38a, 39a and 38b, 39b are in a horizontal condition, and each of their center axes is in coincidence with the center point O of the full toroid-like groove 35a or 35b, and the piston 49 of the hydraulic cylinder 48 of the driving mechanism 46 is at the neutral position so that the pressures of the oil pressure chambers 53, 54 are equal to each other and no thrust is generated in the axis direction of the piston rod 47, and a high speed rotation force is transmitted to the input shaft 7 from the power transmission shaft 6.

Under this condition, the rotation input transmitted to the input shaft 7 is first transmitted to the loading cam 15, and a pressing force is generated by the engaging roller 16 disposed between the loading cam 15 and the first input disk 32a such that the generated pressing force corresponds to the sum of a thrust corresponding to the input torque and a thrust by a pressure oil supplied to the liquid-tight space 20 as required, and by this pressing force, in each of the toroidal type continuously variable transmission mechanisms 30a and 30b, a suitable contact pressure is applied to the contact surface of the input disks 32a, 32b and output disks 34a, 34b and friction rollers 26a, 27a and 26b, 27b, thereby to prevent the decrease in the transmission efficiency.

The rotation force inputted to the first input disk 32a is also transmitted to the second input disk 32b through the ball spline 31a, the rotary shaft 9, and the ball spline 31b, and the rotation forces of both the input disks 32a and 32b are transmitted to the output disks 34a and 34b through the friction rollers 36a, 37a and 36b, 37b in a 1:1 relation, that is, transmitted at the gear ratio of "1", and the rotation forces of these output disks 34a and 34b are transmitted to the output shaft 101 through the output gear 92 and the counter gear 99, and then outputted to the external power transmission shaft 103.

Under this condition, the pressure oil in the pressure chamber 54 is introduced from the introducing opening 73 as a lubricant into the lubricating oil path 70 within the shaft portion 59 constituting the piston rod 47, and further fed to the race joint 60 thereby to be introduced into the lubricant spraying portion 74 of the roller supporting member 38a (39a and 38b, 39b).

In the lubricant spraying portion 74, the lubricant supplied to the lubricating oil path 75 formed in the rotary shaft portion 45 from the end portion side of the ball joint 44 is supplied directly to the lubricant spraying hole 77, and the lubricant is sprayed from this lubricant spraying hole 77 directly onto frictional contact surfaces at which the friction roller 36a (37a and 36b, 37b) is in contact with the input disk 32a (32b), and the output disk 34a (34b). At the same time, the lubricant supplied to the lubricating oil path 75 is supplied to the lubricant spraying holes 87 and 88 through the oil paths 79 to 86 formed in the supporting portion 43 so that the lubricant is sprayed onto the inner races and the outer races of the bearings 41 and 42 to lubricate the bearings 41 and 42. At the same time, the lubricant flowing out of the bearings 41 and 42 is supplied to the above-mentioned frictional contact surface passing through the surface of the friction roller 36a (37a and 36b, 37b) due to the centrifugal force thereof.

In the full toroidal type continuously variable transmission, since the power transmission efficiency at the frictional contact surfaces of the friction rollers 36a, 37a and 36b, 37b is low, the heat generation at the frictional contact surfaces is high. The heat generated at the frictional contact surfaces is conducted to the disk side and the friction roller side, however, the heat capacity volume of the friction roller is smaller than that of the disk, and the friction roller is much severe than the disk side with respect to the capacity. Accordingly, as described earlier, the lubricant is directly sprayed by the lubricant spraying portion 74 onto the frictional contact surfaces of the friction rollers 36a, 37a and 36b, 37b, and onto the bearings 41 and 42 which support the friction rollers. As a result, the sufficient lubrication to the frictional contact surfaces and the cooling thereof can be achieved, and it is possible to form an oil film at the contact surfaces with the friction rollers 36a, 37a and 36b, 37b, and the input and output disks 32a, 34a and 32b, 34b reliably, and it is possible to suppress the decrease in the traction coefficient and to improve the performance and durability, and at the same time, the cooling of the friction rollers 36a, 37a and 36b, 37b themselves can be achieved.

On the other hand, when the speed is to be decreased by increasing the gear ratio from the condition of the gear ratio is "1" in which the friction rollers 36a, 37a and 36b, 37b are rotating while their horizontal condition is maintained, by increasing the pressure of the pressure chamber 53 to become higher than that of the pressure chamber 54 of the hydraulic cylinder 48 constituting each driving mechanism 46, the piston rod 47 is applied with a thrust in a retracting direction. As a result, since the roller supporting members 38a, 39a and 38b, 39b are supported at the position of the ball joint 44 swingably and rotatably, for example, as to the friction roller 36a, depending on the balance of forces of the input and output disks 32a, 34a, as viewed in FIG. 2, the friction roller 36a moves to this side along the center axis line $L_1$ between the input and output disks 32a, 34a. Similarly, as to the other friction rollers 37a, 36b, 37b, they move to this side along the center axis line $L_1$, and as a result of this, in the condition shown in FIG. 1, in the first toroidal type continuously variable transmission 30a, the friction roller 36a is tilted and rotated in the counter-clockwise direction, the friction roller 37a is tilted and rotated in the clockwise direction, and in the second toroidal type continuously variable transmission 30b, the friction roller 36b is tilted and rotated in the clockwise direction, the friction roller 37b is tilted and rotated in the counter-clockwise direction, so that the gear ratio becomes larger than "1". When a desired tilt and rotation angle is reached, the thrust which has been applied to the piston rod 47 is removed to make the piston return to the neutral position. As a result, the tilting and rotation of the friction rollers 36a, 37a and 36b, 37b are stopped and their gear ratio positions are maintained.

At this time, also the roller supporting members 38a, 39a and 38b, 39b are tilted and rotated about the ball joint 44 of the rotary shaft portion 45 in accordance with the friction rollers 36a, 37a and 36b, 37b. Thus, since the spraying position of the lubricant spraying portion 74 with respect to the friction rollers 36a, 37a and 36b, 37b is not changed, the satisfactory lubrication and cooling condition by the lubricant spraying portion 74 can be continued reliably.

Conversely, when the speed is to be increased by reducing the gear ratio from the condition of the gear ratio is "1", the pressure of the pressure chamber 54 of the hydraulic cylinder 48 constituting each driving mechanism 46 is made higher than that of the pressure chamber 53 thereby to apply a thrust in an extending direction to the piston rod 47. As a result, in FIG. 1, in the first toroidal type continuously variable transmission mechanism 30a, the friction roller 36a is tilted and rotated in the clockwise direction, and the friction roller 37a is tilted and rotated in the counter-clockwise direction, and in the second toroidal type continuously variable transmission mechanism 30b, the friction roller 36b is tilted and rotated in the counter-clockwise direction, and the friction roller 37b is tilted and rotated in the clockwise direction, thereby to reduce the gear ratio smaller than "1". When a desired tilt and rotation angle is reached, by removing the thrust which has been applied to the piston rod 47, to make the piston 49 return to the neutral position. As a result, the friction rollers 36a, 37a and 36b, 37b stop their tilting and rotation, and their gear ratio positions are maintained.

As described above, in the above embodiment, the lubricant spraying portion 74 is provided to each of the roller supporting members 38a, 39a and 38b, 39b which rotatably support the friction rollers 36a, 37a and 36b, 37b of the first and second toroidal type continuously variable transmission mechanisms 30a and 30b, and thus, it is possible to spray the lubricant directly onto the frictional contact surfaces of the friction rollers 36a, 37a and 36b, 37b in contact with the input and output disks. As a result, as compared to the half toroidal type continuously variable transmission, it is possible to suppress the heat generation at the contact surfaces at which much heat is generated, and to improve the transmission efficiency of the power.

Furthermore, by spraying the lubricant also onto the bearings 41, 42 which support the friction rollers 36a, 37a and 36b, 37b, it is possible to lubricate the bearings 41, 42 reliably, and at the same time, the lubricant flowing out of the bearings 41, 42 passes through over the surface of the friction rollers 36a, 37a and 36b, 37b due to the centrifugal force thereof and flows into the frictional contact surfaces at the outer peripheral side, thereby to further improve the lubrication of the frictional contact surfaces.

Furthermore, since the supply of the lubricant to the lubricant spraying portion 74 is carried out from the pressure chamber 54 of the hydraulic cylinder 48 through the lubricating oil path 70 formed within the piston rod 47 of the driving mechanism 46 which drives the roller supporting members 38a, 39a and 38b, 39b, there is no need to separately provide a lubricant supply system in the roller supporting members 38a, 39a and 38b, 39b, and thus the whole structure can be made simpler.

Figure 4:
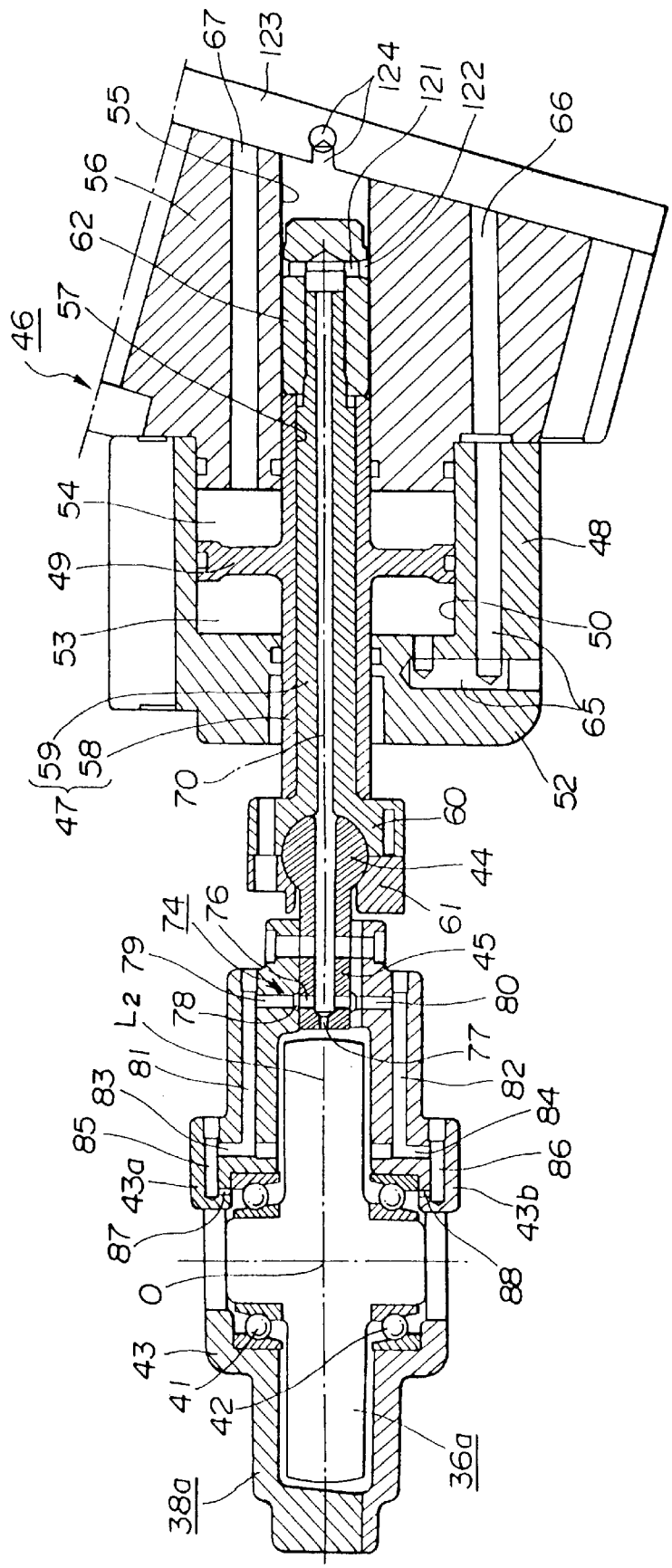
FIG. 4 is a sectional view similar to FIG. 3 showing another embodiment of the present invention.

In the above embodiment, it is described as to the case where the supply of the lubricant to the lubricant spraying portion 74 of the roller supporting members 38a, 39a and 38b, 39b is carried out from the pressure chamber 54 of the hydraulic cylinder 48 constituting the driving mechanism 46, however, the present invention is not limited to this, and a structure as shown in FIG. 4 may be used. Referring to FIG. 4, the oil path 71 formed in the piston rod 47, the annular groove 72 and the lubricant introducing opening 73 are omitted, and instead, the lubricating oil path 70 formed in the shaft portion 59 is extended to the right-hand end, and at the same time, an oil path 121 extending vertically is formed in the lock nut 62 near the right-hand end of the shaft portion 59, and annular grooves 122 are formed at opposite ends of the oil path 121, and the outer diameter of the lock nut 62 extending in the right-hand direction beyond the annular grooves 122 is reduced smaller than the inner diameter of the through hole 55. Furthermore, a lubricating oil path 124 communicating with an external lubricating oil supply source may be formed in an end plate 123 which is fixed to the right-hand end of the supporting block 56 and which blockades the through hole 55. Furthermore, an annular groove (not shown) having a width in the axial direction corresponding to a stroke of the piston rod may be formed in the inner peripheral surface of the hydraulic cylinder 48 or the supporting block 56 at a position facing the cylindrical portion 58. This annular groove may be communicated with an external lubricating oil source. An oil path may be formed between this annular groove and the lubricating oil path 70 of the shaft portion 59.

Also, in the above embodiment, it is described as to the case where the roller supporting member 38a (39a and 38b, 39b) and the driving mechanism 46 are coupled with each other swingably and rotatably by the ball joint 44 and the race joint 60, the race joint cover 61, however, the present invention is not limited to this, but another coupling mechanism may be used to couple swingably and rotatably. Alternatively, the coupling mechanism may be omitted, and both the members may be connected directly to rotate the piston rod 47 and the piston 49.

Furthermore, in the above embodiment, it is described as to the case where the roller supporting members 38a, 39a and 38b, 39b are arranged in upper-lower and left-right symmetry, however, the present invention is not limited to this, but it they are not in contact with the input and output disks 32a, 32b and 34a, 34b, an arbitrary arrangement may be used.

Furthermore, in the above embodiment, it is described as to the case where the two sets of friction rollers and the two sets of roller supporting members are provided in the toroidal type continuously variable transmission mechanisms 30a, 30b, however, the present invention is not limited to this, but three sets or more of friction rollers and roller supporting members may be arranged along the full toroid groove at predetermined intervals.

The present invention otters the following advantages.

As described in the foregoing, in the first aspect of the invention, since it is possible to directly spray the lubricant from the lubricant spraying portion 74 formed in the roller supporting member onto the frictional contact surfaces of the friction roller in contact with the input disk and the output disk, the amount of the lubricant can be adjusted depending on the load easily, and the lubrication and cooling of the frictional contact surfaces can be made effectively. As a result, it is possible to suppress the temperature rise of the frictional contact surfaces, and the reduction of the traction coefficient of the frictional contact surfaces due to the heat generation can be suppressed and the performance and the durability can be improved. Furthermore, even when the friction roller is tilted and rotated due to the gear shift, since the roller supporting member is also tilted and rotated as a unit, the spray position of the lubricant by the lubricant spraying portion is not changed, and the advantage is provided in that the sufficient lubrication and cooling can be achieved at any gear ratio position of the friction roller.

Furthermore, in the second aspect of the invention, the lubricant can be sprayed directly onto the frictional contact surfaces of the friction roller from each spraying opening of the lubricant spraying portion of the roller supporting member, and in addition, the lubricant can be sprayed directly onto the bearings around the center shaft of the friction roller. Moreover, the lubricant flowing out of the bearings flows to the frictional contact surface side of the outer peripheral surface due to the centrifugal force so that the lubrication of the friction roller can be performed satisfactorily while cooling the whole surface of the friction roller.

In the third aspect of the invention, since the lubricant is supplied to the lubricant spraying portion through the internal path from the driving mechanism side which drives the roller supporting member, there is no need to provide a lubricant supply route separately in the roller supporting member, and thus, the supply of the lubricant can be achieved easily without making the roller supporting member and the driving mechanism large in size.

In the fourth aspect of the invention, since the pressure oil supplied to the hydraulic cylinder for moving the roller supporting member is used as the lubricant, there is no need to provide a lubricating oil supply system separately for the driving mechanism.

Furthermore, in the fifth aspect of the invention, since the lubricant is supplied to the lubricant spraying portion of the roller supporting member through the internal path of the driving mechanism from the external lubricant supply source, it is possible to form the lubricating oil supply system by using the members already provided.

I claim:

1. A full toroidal continuously variable transmission comprising:

an input disk and an output disk disposed opposed to each other to form a full toroidal groove by opposing surfaces thereof;

a friction roller disposed within the full toroidal groove of the input and output disks to frictionally cone both said disks;

a roller supporting member including a supporting portion for rotatably supporting the friction roller and a shaft portion connected to the supporting portion for transmitting a driving force to the supporting portion in an axial direction of the shaft portion, which axial direction passes through a center of the friction roller, the axial direction of the shaft portion being tilted by a predetermined angle with respect to an axis line of the full toroidal groove also passing through the center of the friction roller and parallel to the input disk and the output disk, the roller supporting member being supported at the shaft portion rotatably and movably in the axial direction of a shaft portion; and a driving mechanism coupled with the shaft portion of the roller supporting member for driving the roller supporting member in the axial direction of the shaft portion, the driving mechanism including a hydraulic cylinder including a piston and two pressure chambers for moving the piston by supplying pressure oil to the pressure chambers, wherein a lubricant spraying portion is formed in the roller supporting member to spray a lubricant to at least a frictional contact surface of the friction roller engaging the input disk and the output disk, wherein the lubricant spraying portion includes a first lubricant spraying opening which opposes the frictional contact surface of the friction roller, and a second lubricant spraying opening which opposes a bearing for rotatably supporting the friction roller, and wherein the second spraying portion is supplied with the lubricant by way of a path which is segregated from the frictional contact surfaces of the friction roller in order to avoid an effect of a centrifugal force produced by a rotation of the friction roller.

2. A full toroidal continuously variable transmission according to claim 1, wherein the driving mechanism includes the hydraulic cylinder, and the pressure oil of one of the two pressure chambers of the hydraulic cylinder is supplied as the lubricant to the first and second lubricant spraying openings of the lubricant spraying portion through an internal path formed within a piston rod of the hydraulic cylinder.

3. A full toroidal continuously variable transmission according to claim 1, wherein supply of the lubricant to the lubricant spraying portion is performed through an inner path of the driving mechanism from an external lubricant supply source.

4. A full toroidal continuously variable transmission according to claim 1, wherein an orifice is provided in the first lubricant spraying opening of the lubricant spraying portion.

5. The full toroidal continuously variable transmission according to claim 1, wherein the path for the lubricant to the second spraying opening is formed in the supporting member.

6. The full toroidal continuously variable transmission according to claim 1, wherein a ball joint having the shaft portion, with an internal oil path therein, is connected to a front end of a piston rod of the hydraulic cylinder, the first lubricant spraying opening being connected to the internal oil path formed on a front end of the shaft portion, and another internal oil path connected with the internal oil path formed in the shaft portion and extended to the supporting portion for rotatably supporting the friction roller is formed in the roller supporting member, the second lubricant spraying opening being formed at a front end of the another internal oil path in the roller supporting member.

7. A full toroidal continuously variable transmission comprising:

an input disk and an output disk disposed opposed to each other to form a full toroidal groove by opposing surfaces thereof;

a friction roller disposed within the full toroidal groove of the input and output disks to frictionally contact both said disks;

a roller supporting member including a supporting portion for rotatably supporting the friction roller and a shaft portion connected to the supporting portion for transmitting a driving force to the supporting portion in an axial direction of the shaft portion, which axial direction passes through a center of the friction roller, the axial direction of the shaft portion being tilted by a predetermined angle with respect to an axis line of the full toroidal groove also passing through the center of the friction roller in parallel with the input disk and the output disk, the roller supporting member being supported at the shaft portion rotatably and movably in the axial direction of the shaft portion; and a driving mechanism coupled with the shaft portion of the roller supporting member for driving the roller supporting member in the axial direction of the shaft portion, wherein the lubricant spraying portion includes a first lubricant spraying opening which opposes the frictional contact surface of the friction roller in order to supply a lubricant to a friction contact surface of the friction roller engaging the input disk and output disk, and a second lubricant spraying opening which opposes a bearing for rotatably supporting the friction roller in order to supply a lubricant to the bearing, wherein the second lubricant spraying opening is supplied with the lubricant by way of a path which is segregated from the frictional contact surfaces of the friction roller in order to avoid an effect of a centrifugal force produced by a rotation of the friction roller, and wherein the driving mechanism includes a hydraulic cylinder including a piston and two pressure chambers for moving the piston by supplying pressure oil to the pressure chambers, and the pressure oil of one of the two pressure chambers of the hydraulic cylinder is supplied as the lubricant to the lubricant spraying portion through an internal path formed within a piston rod of the hydraulic cylinder.

8. A full toroidal continuously variable transmission according to claim 7, wherein supply of the lubricant to the lubricant spraying portion is effected through an inner path from the driving mechanism side.

9. A full toroidal continuously variable transmission according to claim 7, wherein supply of the lubricant to the lubricant spraying portion is performed through an inner path of the driving mechanism from an external lubricant supply source.

10. A full toroidal continuously variable transmission according to claim 7, wherein, in order to reduce a transmission ratio to increase a speed of a vehicle, the pressure oil is supplied to the pressure chambers to drive the piston.

11. The full toroidal continuously variable transmission according to claim 7, wherein the path for the lubricant to the second spraying opening is formed in the supporting member.

12. The full toroidal continuously variable transmission according to claim 7, wherein a ball joint having the shaft portion, with an internal oil path therein, is connected to a front end of the piston rod of the hydraulic cylinder, the first lubricant spraying opening being connected to the internal oil path formed on a front end of the shaft portion, and another internal oil path connected with the internal oil path formed in the shaft portion and extended to the supporting portion for rotatably supporting the friction roller is formed in the roller supporting member, the second lubricant spraying opening being formed at a front end of the another internal oil path in the roller supporting member.

* * * * *